United States Patent
Liu et al.

(10) Patent No.: US 11,216,716 B2
(45) Date of Patent: Jan. 4, 2022

(54) MEMORY CHIP CAPABLE OF PERFORMING ARTIFICIAL INTELLIGENCE OPERATION AND OPERATION METHOD THEREOF

(71) Applicant: Winbond Electronics Corp., Taichung (TW)

(72) Inventors: Ren-Shuo Liu, Taichung (TW); Cheng-Hsuan Cheng, Taichung (TW)

(73) Assignee: Winbond Electronics Corp., Taichung (TW)

( * ) Notice: Subject to any disclaimer, the term of this patent is extended or adjusted under 35 U.S.C. 154(b) by 467 days.

(21) Appl. No.: 16/421,420

(22) Filed: May 23, 2019

(65) Prior Publication Data

US 2020/0293854 A1    Sep. 17, 2020

(30) Foreign Application Priority Data

Mar. 15, 2019 (TW) ................................. 108108853

(51) Int. Cl.
  *G06N 3/02*    (2006.01)
(52) U.S. Cl.
  CPC ...................................... *G06N 3/02* (2013.01)
(58) Field of Classification Search
  CPC ...................................................... G06N 3/02
  See application file for complete search history.

(56) References Cited

U.S. PATENT DOCUMENTS

| 9,406,017 B2 | 8/2016 | Hinton et al. |
| 2018/0165412 A1 | 6/2018 | Frey et al. |
| 2018/0181857 A1* | 6/2018 | Mathew ................ G06F 7/5443 |
| 2019/0279082 A1* | 9/2019 | Moloney .................. G06N 3/08 |
| 2020/0134443 A1* | 4/2020 | Qin ...................... G06N 3/0635 |

(Continued)

FOREIGN PATENT DOCUMENTS

GB    2560600    9/2018

OTHER PUBLICATIONS

Wei Wen et al., "Learning Structured Sparsity in Deep Neural Networks", Thesis of Master Degree, University of Pittsburgh, Oct. 18, 2016, pp. 1-9.

(Continued)

*Primary Examiner* — Olisa Anwah
(74) *Attorney, Agent, or Firm* — JCIPRNET

(57) ABSTRACT

A memory chip capable of performing artificial intelligence operation and an operation method thereof are provided. The memory chip includes a memory array and an artificial intelligence engine. The memory array is configured to store input feature data and a plurality of weight data. The input feature data includes a plurality of first subsets, and each of the weight data includes a plurality of second subsets. The artificial intelligence engine includes a plurality of feature detectors. The artificial intelligence engine is configured to access the memory array to obtain the input feature data and the weight data. Each of the feature detectors selects at least one of the second subsets from the corresponding weight data as a selected subset based on a weight index, and the feature detectors perform a neural network operation based on the selected subsets and the corresponding first subsets.

14 Claims, 6 Drawing Sheets

(56) References Cited

U.S. PATENT DOCUMENTS

2020/0160125 A1* 5/2020 Wang ............... G06N 3/04
2021/0216747 A1* 7/2021 Rodyushkin ....... G06K 9/00201

OTHER PUBLICATIONS

Vahideh Akhlaghi et al.,"SnaPEA: Predictive Early Activation for Reducing Computation in Deep Convolutional Neural Networks", 2018 ACM/IEEE 45th Annual International Symposium on Computer Architecture (ISCA), Jun. 2018, pp. 1-12.

Takayuki Ujiie et al.,"Approximated Prediction Strategy for Reducing Power Consumption of Convolutional Neural Network Processor", 2016 IEEE Conference on Computer Vision and Pattern Recognition Workshops, Jun. 2016, pp. 1-7.

Ren-Shuo Liu et al.,"DrowsyNet: Convolutional Neural Networks with Runtime Power-Accuracy Tunability Using Inference-Stage Dropout", 2018 International Symposium on VLSI Design, Automation and Test, Apr. 2018, pp. 1-4.

Sina Boroumand et al.,"Exploration of Approximate Multipliers Design Space using Carry Propagation Free Compressors", 2018 23rd Asia and South Pacific Design Automation Conference, Jan. 2018, pp. 1-6.

Tongxin Yang et al.,"A Low-Power High-Speed Accuracy-Controllable Approximate Multiplier Design", 2018 23rd Asia and South Pacific Design Automation Conference, Jan. 2018, pp. 1-6.

Ao Ren et al.,"SC-DCNN: Highly-Scalable Deep Convolutional Neural Network using Stochastic Computing", Thesis of Master Degree, Syracuse University, Nov. 2016, pp. 1-14.

Mohsen Imani et al.,"CANNA: Neural network acceleration using configurable approximation on GPGPU", 2018 23rd Asia and South Pacific Design Automation Conference, Jan. 2018, pp. 1-8.

Yu-Shun Hsiao et al.,"FlexNet: Neural Networks with Inherent Inference-Time Bitwidth Flexibility", Thesis of Master Degree, National Tsing Hua University, Oct. 2018, pp. 1-2.

* cited by examiner

MEMORY CHIP CAPABLE OF PERFORMING ARTIFICIAL INTELLIGENCE OPERATION AND OPERATION METHOD THEREOF

CROSS-REFERENCE TO RELATED APPLICATION

This application claims the priority benefit of Taiwan Application No. 108108853, filed on Mar. 15, 2019. The entirety of the above-mentioned patent application is hereby incorporated by reference herein and made a part of this specification.

BACKGROUND OF THE INVENTION

1. Field of the Invention

The invention relates to a memory architecture, and more particularly, to a memory chip capable of performing artificial intelligence (AI) operation and an operation method thereof.

2. Description of Related Art

With the evolution of artificial intelligence (AI) operations, the AI operations have been widely applied in cloud servers installed with high-speed graphics processing unit (GPU) as well as in small portable electronic devices like cell phones, tablet computers and IoT (Internet of Things) devices. Accordingly, convolutional neural network operations like image analysis may be performed on the devices via a neural network model to improve an operation performance.

For the portable electronic device, reducing power consumption is a well-known topic to be addressed. However, because a large number of parameters are required for many convolutional neural networks, the convolutional neural network operations performed on the portable electronic device will result in a considerable power consumption. In the small portable electronic device, because a cache memory on a processing chip is not enough for storing that many parameters, per each operation, the parameters need to be moved from a dynamic random access memory (DRAM) outside an artificial intelligence operation engine into the processing chip, resulting in high power consumption. In general, power consumption generated by moving data from the external DRAM to the processing chip is approximately 130 times power consumption generated by reading a static random access memory (SRAM) in the processing chip, and is approximately 6400 times power consumption generated by a common addition operation.

SUMMARY OF THE INVENTION

The invention provides a memory chip capable of performing artificial intelligence and an operation method thereof, which can select only important subsets from weight data for neural network operation to reduce the parameters that need to be moved from a memory outside an artificial intelligence engine.

The memory chip capable of performing artificial intelligence operation of the invention includes a memory array and an artificial intelligence engine. The memory array is configured to store input feature data and a plurality of weight data. The input feature data includes a plurality of first subsets, and each of the weight data includes a plurality of second subsets. The artificial intelligence engine is coupled to the memory array, and includes a plurality of feature detectors. The artificial intelligence engine is configured to access the memory array to obtain the input feature data and the weight data. Each of the feature detectors selects at least one of the second subsets from the corresponding weight data as a selected subset based on a weight index, and the feature detectors perform a neural network operation based on the selected subsets and the corresponding first subsets.

In an embodiment of the invention, in a low power mode, each of the feature detectors selects at least one of the second subsets from the corresponding weight data as the selected subset based on the weight index to perform the neural network operation.

The operation method of the memory chip capable of performing artificial intelligence operation includes: providing input feature data and a plurality of weight data, the input feature data including a plurality of first subsets, each of the weight data including a plurality of second subsets; selecting at least one of the second subsets from each of the weight data as a selected subset based on a weight index; and performing a neural network operation based on the selected subsets and the corresponding first subsets.

Based on the above, the memory chip of the invention and the operation method thereof are capable of selecting the important subsets from the weight data for the neural network operation by a method approximate to the inner product operation. As a result, since the parameters required by the operation may be significantly reduced, the parameters that need to be moved from the memory outside the artificial intelligence engine as well as the number of times for moving the parameters may both be reduced to achieve the purpose of reducing power consumption.

To make the above features and advantages of the disclosure more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
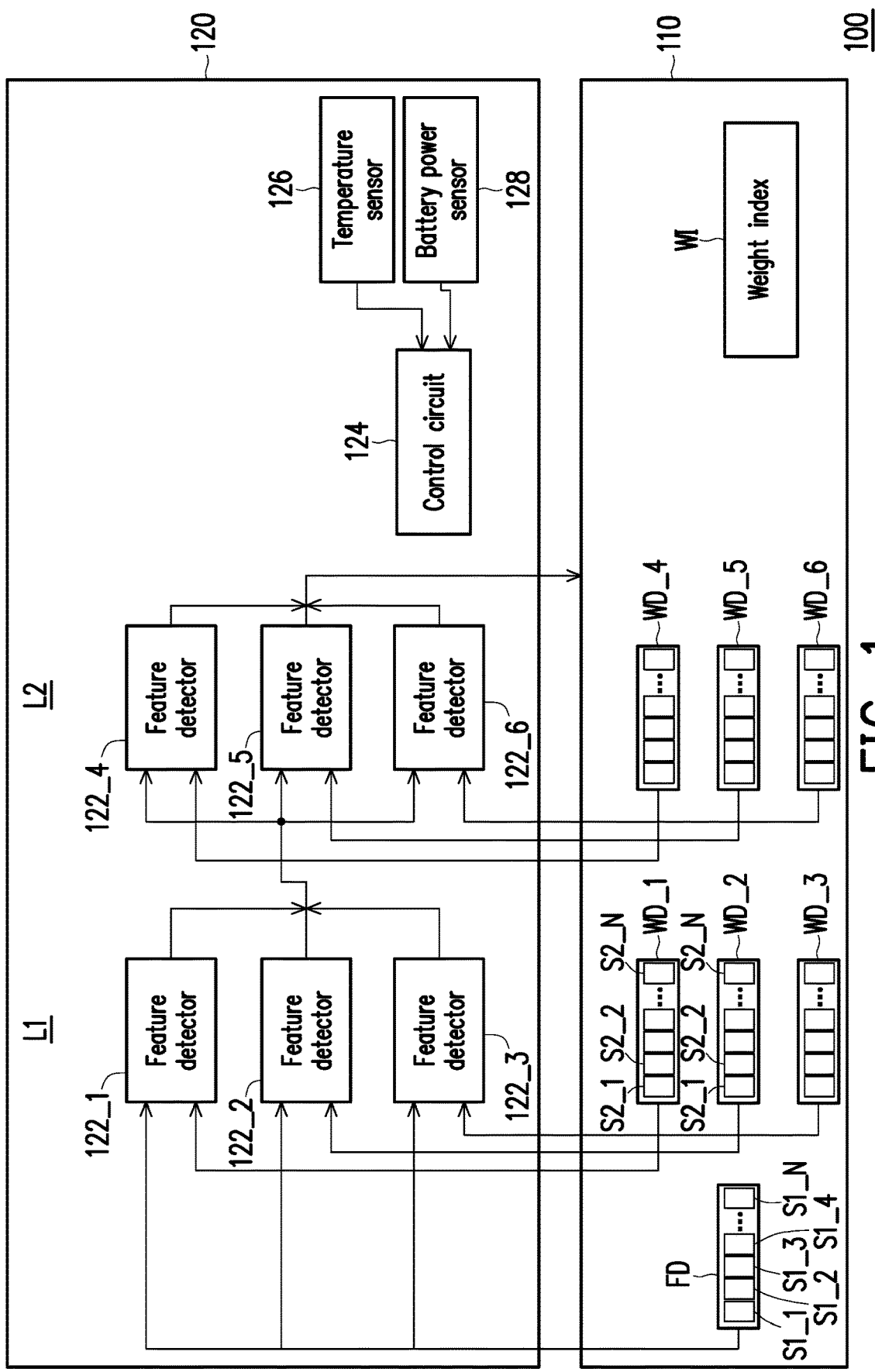
FIG. 1 is a block diagram of a memory chip according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

With reference to FIG. 1, FIG. 1 is a block diagram of a memory chip according to an embodiment of the invention. A memory chip 100 includes a memory array 110 and an artificial intelligence engine 120. In this embodiment, the memory array 110 is composed of, for example, a volatile memory element, such as a dynamic random access memory. In other embodiments, the memory array 110 may also be composed of a non-volatile memory element, such as a flash memory, a phase change memory, and a resistive memory. The memory array 110 includes a plurality of memory areas for storing input feature data FD and 6 weight data WD_1 to WD_6. Based on actual requirements, persons skilled in the art may determine the number of the weight data, and the embodiment of the invention is not limited thereto.

As shown by FIG. 1, the input feature data FD includes N first subsets S1_1 to S1_N, and each of the weight data WD_1 to WD_6 also includes N second subsets S2_1 to S2_N. Here, N is a positive integer greater than 1. The first subsets S1_1 to S1_N are formed by, for example, dividing parameter vectors in the input feature data FD into N equal parts. The second subsets S2_1 to S2_N in each of the weight data WD_1 to WD_6 are also formed by, for example, dividing parameter vectors in each of the weight data WD_1 to WD_6 into N equal parts. N is, for example, between 4 and 16. It should be noted that, in other embodiments, a size of each of the first subsets S1_1 to S1_N may be different, and a size of each of the second subsets S2_1 to S2_N may also be different. The embodiment of the invention is not limited in this regard.

A weight index WI is stored in the memory array 110. The weight index WI is configured to provide information regarding selected subsets in the weight data WD_1 to WD_6. In this invention, because the weight data WD_1 to WD_6 are data previously trained by using an operation model, the second subsets S2_1 to S2_N in the weight data WD_1 to WD_6 can be pre-analyzed to select more important subsets as the selected subsets. For instance, after obtaining a sum by adding absolute values of vector values respectively for each of the second subsets S2_1 to S2_N of the weight data WD_1, the second subsets with the sum greater than a predetermined value may be selected as the selected subset of the weight data WD_1, and an index value of the selected subset may be recorded in the weight index WI. By analogy, the index values of the selected subsets of each of the weight data WD_1 to WD_6 may be recorded in the weight index WI, so as to establish the complete weight index WI. Then, the weight index WI is stored in the memory array 110. Besides the method described above, for example, the selected subset may also be obtained by comparing results obtained by adding sums of square of the values in the second subsets S2_1 to S2_N. In particular, the invention may select one or more selected subsets from each of the weight data. Further, the invention may also store the selected subsets directly in the weight index WI. In an embodiment, the weight index WI is, for example, a lookup table.

The artificial intelligence engine 120 is coupled to the memory array 110. The artificial intelligence engine 120 includes 6 feature detectors 122_1 to 122_6. The feature detectors 122_1 to 122_6 may be regarded as neurons in a neural network operation. The artificial intelligence engine 120 is configured to access the memory array 110 to obtain the input feature data FD and the weight data WD_1 to WD_6. As shown by FIG. 1, the feature detectors 122_1 to 122_3 are arranged in a first layer L1, and the feature detectors 122_4 to 122_6 are arranged in a second layer L2. The artificial intelligence engine 120 can transmit each of the weight data WD_1 to WD_6 to the corresponding feature detectors 122_1 to 122_6. The artificial intelligence engine 120 may be, for example, a PIM (Processing In Memory) architecture or an NMP (Near Memory Processing) architecture constructed by circuit elements including a control logic unit, an arithmetic logic unit, a cache memory, etc. Based on actual requirements, persons skilled in the art may determine the distribution for the layers in the artificial intelligence engine 120, and the embodiment of the invention is not limited thereto. Further, although the artificial intelligence engine 120 is integrated within the memory chip 100 in this embodiment, the invention is not limited thereto. In other embodiments, the artificial intelligence engine 120 may also be disposed on an independent chip, and may process the data (e.g., the input feature data FD, the weight data WD_1 to WD_6 and the weight index WI) in the memory chip 100 through an external connection.

It should be noted that, in this embodiment, the number of the feature detectors 122_1 to 122_6 is identical to the number of the weight data WD_1 to WD_6. Nonetheless, in other embodiments, the number of the feature detectors may be less than the number of the weight data (referring to the following embodiments).

The artificial intelligence engine 120 further includes a control circuit 124, a temperature sensor 126 and a battery power sensor 128. The control circuit 124 may be, for example, a logical circuit constituted by using a plurality of logic gates. The temperature sensor 126 may be any type of temperature measuring element and circuit, and the battery power sensor 128 may be any type of battery power measuring element and circuit. The embodiment of the invention is not limited in this regard.

Figure 2:
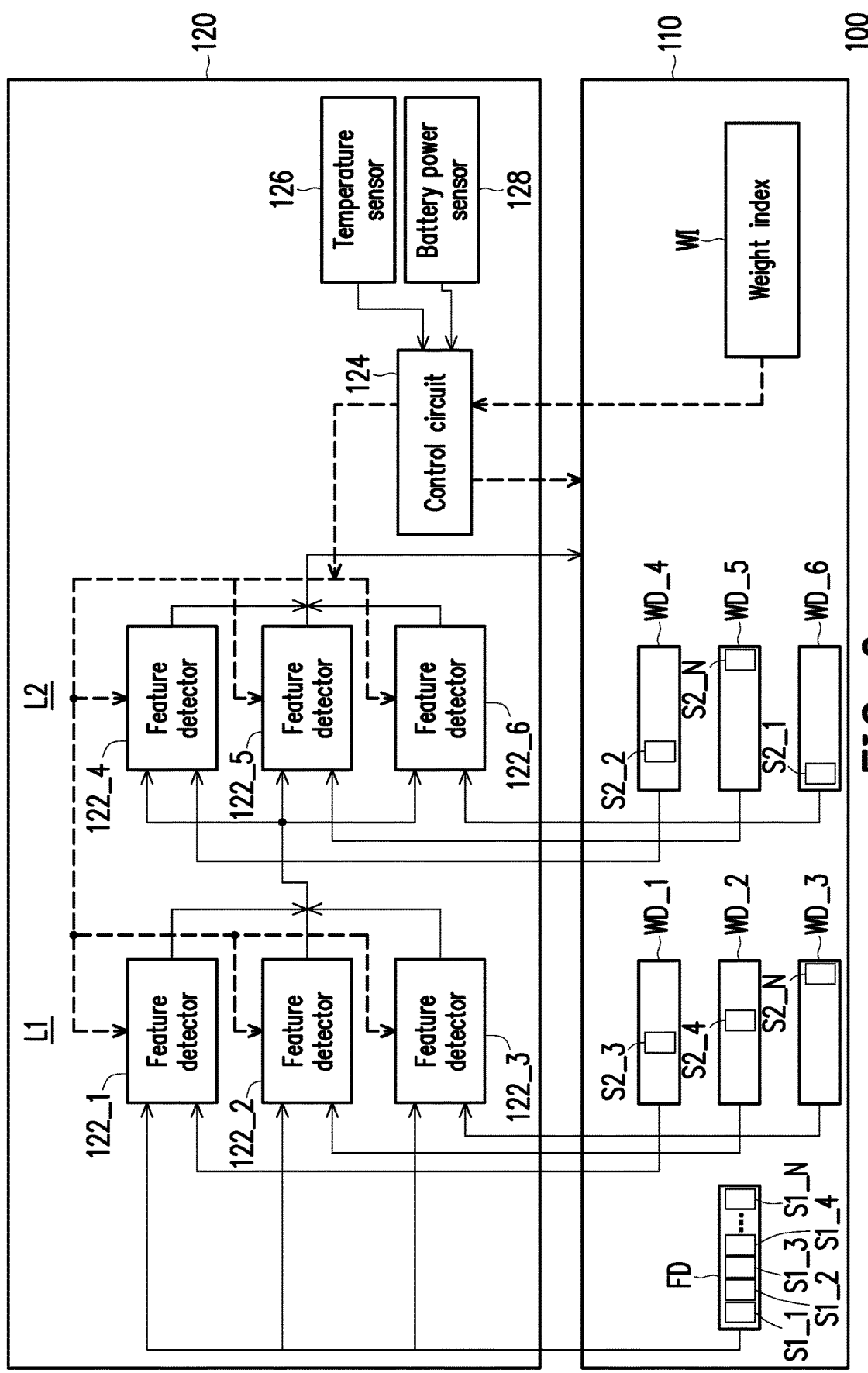
FIG. 2 is an operation diagram of an operation method of a memory chip capable of performing artificial intelligence operation according to an embodiment of the invention.

FIG. 2 is an operation diagram of an operation method of a memory chip capable of performing artificial intelligence operation according to an embodiment of the invention. In FIG. 2, each of the feature detectors 122_1 to 122_6 can select at least one of the second subsets S2_1 to S2_N from the corresponding weight data WD_1 to WD_6 as the selected subset based on the weight index WI. Accordingly, the feature detectors 122_1 to 122_6 can read only the selected subsets, and perform the neural network operation based on the selected subsets and the corresponding first subsets in the first subsets S1_1 to S1_N of the input feature data FD. An operation method of the memory chip of the invention will be specifically described with reference to various elements in the memory chip 100.

First of all, the control circuit 124 can determine whether to enter a low power mode based on various environmental conditions. For instance, when the temperature sensor 126 senses that a temperature is greater than a temperature threshold, the temperature sensor 126 can notify the control circuit 124 to make the artificial intelligence engine 120 enter the low power mode. On the other hand, when the battery power sensor 128 senses that a battery power of a portable electronic device installed with the memory chip 100 is less than a power threshold, the temperature sensor 128 can also notify the control circuit 124 to make the artificial intelligence engine 120 enter the low power mode. In other embodiments, the low power mode may also be entered when an accuracy of artificial intelligence operation is lower than a threshold, and the embodiment of the invention is not limited thereto.

When determining that the low power mode is being entered, the control circuit 124 can send a command to the memory array 110 to obtain the weight index WI from the memory areas in the memory array 110, and transmit the weight index WI to the feature detectors 122_1 to 122_6.

When the artificial intelligence engine 120 performs the neural network operation, the artificial intelligence engine 120 can access the memory array 110 to obtain the input feature data FD and the weight data WD_1 to WD_6, and transmit the weight data WD_1 to WD_6 to the corresponding feature detectors 122_1 to 122_6. As shown by FIG. 2, the artificial intelligence engine 120 transmits the weight data WD_1 to the feature detector 122_1, transmits the weight data WD_2 to the feature detector 122_2, and so on and so forth.

In the low power mode, each of the feature detectors 122_1 to 122_6 can select at least one of the second subset S2_1 to S2_N from each of the weight data WD_1 to WD_6 as the selected subset based on the weight index WI. For instance, as shown by FIG. 2, the feature detector 122_1 selects the second subset S2_3 that is more important in the weight data WD_1 as the selected subset based on the weight index WI; the feature detector 122_2 selects the second subset S2_4 that is more important in the weight data WD_2 as the selected subset based on the weight index WI; the feature detector 122_3 selects the second subset S2_N that is more important in the weight data WD_3 as the selected subset based on the weight index WI; the feature detector 122_4 selects the second subset S2_2 that is more important in the weight data WD_4 as the selected subset based on the weight index WI; the feature detector 122_5 selects the second subset S2_N that is more important in the weight data WD_5 as the selected subset based on the weight index WI; the feature detector 122_6 selects the second subset S2_1 that is more important in the weight data WD_6 as the selected subset based on the weight index WI.

Then, in FIG. 2, each of the feature detectors 122_1 to 122_6 can read only the respectively selected subset, and perform the neural network operation based on the respectively selected subset and the corresponding first subset in the first subsets S1_1 to S1_N in the input feature data FD. For instance, in the first layer L1, the feature detector 122_1 can read only the second subset S2_3 being the selected subset in the weight data WD_1, and perform an inner product operation on the second subset S2_3 and the corresponding first subset S1_3 in the input feature data FD. The feature detector 122_2 can read only the second subset S2_4 being the selected subset in the weight data WD_2, and perform the inner product operation on the second subset S2_4 and the corresponding first subset S1_4 in the input feature data FD. The feature detector 122_3 can read only the second subset S2_N being the selected subset in the weight data WD_3, and perform the inner product operation on the second subset S2_N and the corresponding first subset S1_N in the input feature data FD. In the second layer L2, the feature detector 122_4 can read only the second subset S2_2 being the selected subset in the weight data WD_4, and perform the inner product operation on the second subset S2_2 and the corresponding subset in the operation result of the first layer L1. The feature detector 122_5 can read only the second subset S2_N being the selected subset in the weight data WD_5, and perform the inner product operation on the second subset S2_N and the corresponding subset in the operation result of the first layer L1. The feature detector 122_6 can read only the second subset S2_1 being the selected subset in the weight data WD_6, and perform the inner product operation on the second subset S2_1 and the corresponding subset in the operation result of the first layer L1. Further, the artificial intelligence engine 120 can output a result of the neural network operation to the memory array 110 to thereby complete the operation.

Based on the operation method described above, the feature detectors 122_1 to 122_6 can read only a part of important subsets in the weight data WD_1 to WD_6 based on the weight index WI instead of reading all of the subsets. In this way, the parameters to be moved from the memory array 110 to the artificial intelligence engine 120 may be reduced to thereby reduce power consumption.

The neural network operation in this embodiment may be, for example, a fully connected layer operation, but the embodiment of the invention is not limited thereto.

It should be noted that, in this embodiment of the invention, each of the feature detectors 122_1 to 122_6 selects one second subset in the second subsets S2_1 to S2_N from each of the weight data WD_1 to WD_6 as the selected subset. However, the embodiment of the invention is not limited in this regard. In other embodiments, each of the feature detectors 122_1 to 122_6 can also select multiple second subsets in the second subsets S2_1 to S2_N from each of the weight data WD_1 to WD_6 as the selected subset based on the weight index WI.

In the embodiment where multiple second subsets are selected as the selected subset, each of the feature detectors 122_1 to 122_6 can select, for example, a plurality of the second subsets consecutively arranged as the selected subset based on the weight index WI, but the embodiment of the invention is not limited thereto. In other embodiments, a plurality of the second subsets separately arranged may also be selected as the selected subset.

Figure 3:
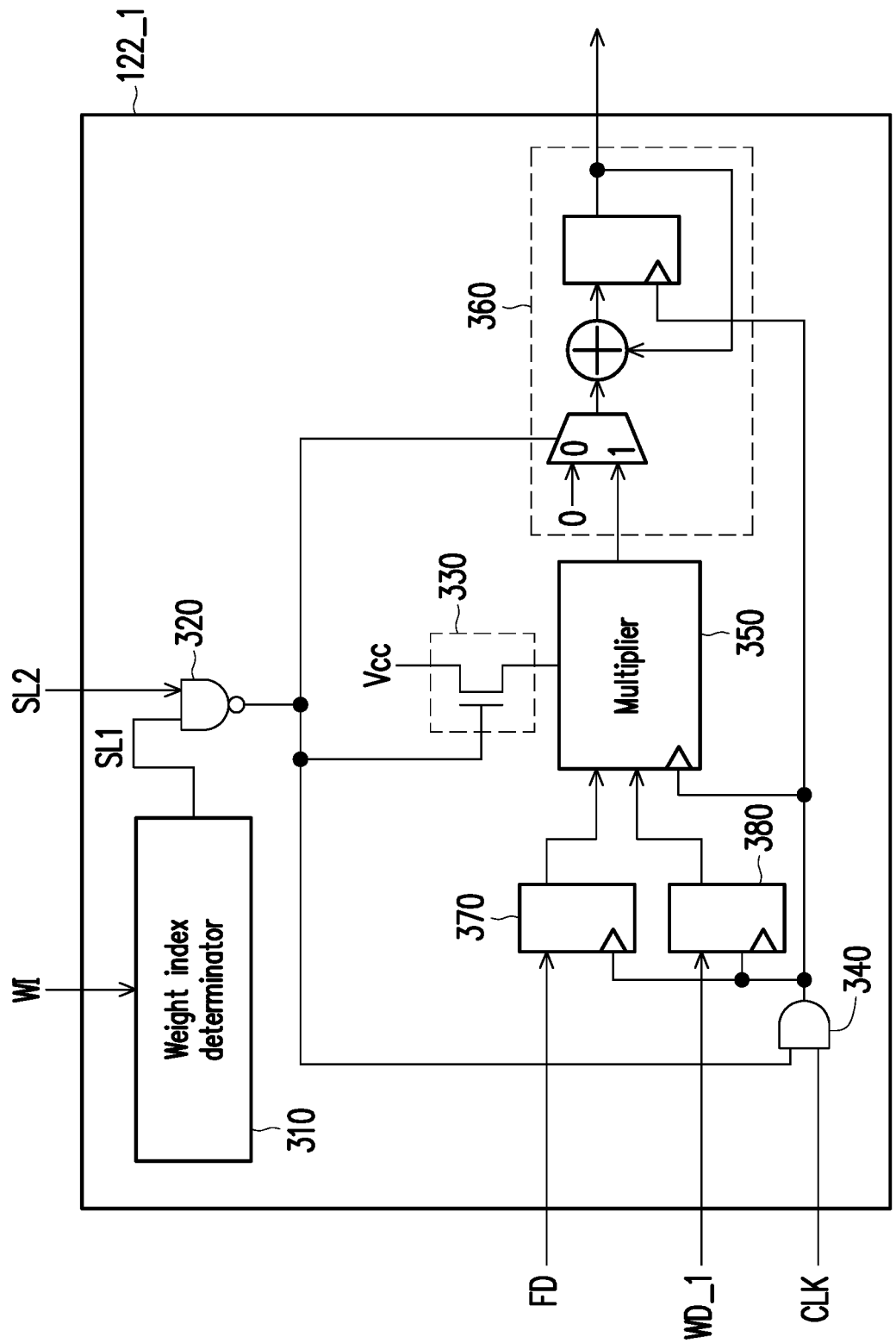
FIG. 3 is a circuit diagram of a feature detector according to an embodiment of the invention.

FIG. 3 is a circuit diagram of a feature detector according to an embodiment of the invention. Referring to FIG. 3 in which the feature detector 122_1 is taken as an example, the feature detector 122_1 includes a weight index determinator 310, an NAND gate 320, a switch 330, an AND gate 340, a multiplier 350, an accumulator 360, a buffer 370 and a buffer 380.

The weight index determinator 310 may be, for example, a logical circuit constituted by using a plurality of logic gates. The weight index determinator 310 obtains the weight index WI from the memory array 110 to output a weight index determination signal SL1.

A first input terminal of the NAND gate 320 is coupled to the weight index determination signal SL1, and a second input terminal of the NAND gate 320 is coupled to the control circuit 124 in the artificial intelligence engine 120 to receive a low power determination signal SL2.

The switch 330 may be composed of transistors, for example. A first terminal of the switch 330 is coupled to an operating voltage Vcc. A control terminal of the switch 330 is coupled to an output terminal of the NAND gate 320.

A first input terminal of the AND gate 340 is coupled to the output terminal of the NAND gate 320. A second input terminal of the AND gate 340 is coupled to a clock signal CLK.

The multiplier 350 is coupled to a second terminal of the switch 330 and an output terminal of the AND gate 340 to receive the operating voltage Vcc and operate in response to the clock signal CLK. Also, the multiplier 350 receives the input feature data FD and the weight data WD_1 via the buffers 370 and 380 for performing a multiplication operation.

The accumulator 360 is coupled to the output terminal of the NAND gate 320, an output terminal of the multiplier 350 and the output terminal of the AND gate 340. The accumulator 360 accumulates operation results of the multiplier based on the weight index determination signal SL1 and the low power determination signal SL2.

Operations of the feature detector 122_1 shown by FIG. 3 are described below. When the control circuit 124 in the artificial intelligence engine 120 determines that the low power mode is not being entered, the control circuit 124 can pull down the low power determination signal SL2 to a low logic level. At the time, the NAND gate 320 maintains outputting a high logic level so the switch 330 remains turned on and transmits the operating voltage Vcc to the multiplier 350. Further, the AND gate 340 also transmits the clock signal CLK to the multiplier 350 and the accumulator 360. In this case, the multiplier 350 and the accumulator 360 can sequentially perform the inner production operation on all of the first subsets S1_1 to S1_N in the input feature data FD and all of the second subsets S2_1 to S2_N in the weight data WD_1.

On the other hand, when the control circuit 124 in the artificial intelligence engine 120 determines that the low power mode is being entered, the control circuit 124 can pull up the low power determination signal SL2 to the high logic level, and transmit the weight index WI to the weight index determinator 310.

The weight index determinator 310 can adjust the logic level of the weight index determination signal SL1 based on the weight index WI. For instance, during the period in which the multiplier 350 and the accumulator 360 sequentially performs the inner production operation on the first subsets S1_1 to S1_N in the input feature data FD and the second subsets S2_1 to S2_N in the weight data WD_1, when it is the turn for the selected subset recorded in the weight index WI, the weight index determinator 310 can pull down the weight index determination signal SL1 to the low logic level. At this time, the NAND gate 320 outputs the high logic level so the multiplier 350 and the accumulator 360 can perform the inner production operation on the selected subset in the weight data WD_1 and the corresponding first subset in the first subsets S1_1 to S1_N.

Conversely, when it is the turn for the rest of the second subsets excluding the selected subset, the weight index determinator 310 can pull up the weight index determination signal SL1 to the high logic level. At this time, the NAND gate 320 outputs the low logic level so the switch 330 is turned off and stops transmitting the operating voltage Vcc to the multiplier 350. Further, the AND gate 340 also stops transmitting the clock signal CLK to the multiplier 350 and the accumulator 360. In this case, the multiplier 350, the accumulator 360, the buffer 370 and the buffer 380 are all disabled from reading the rest of the second subsets excluding the selected subset. In this way, power consumption may be reduced for the chip.

Figure 4:
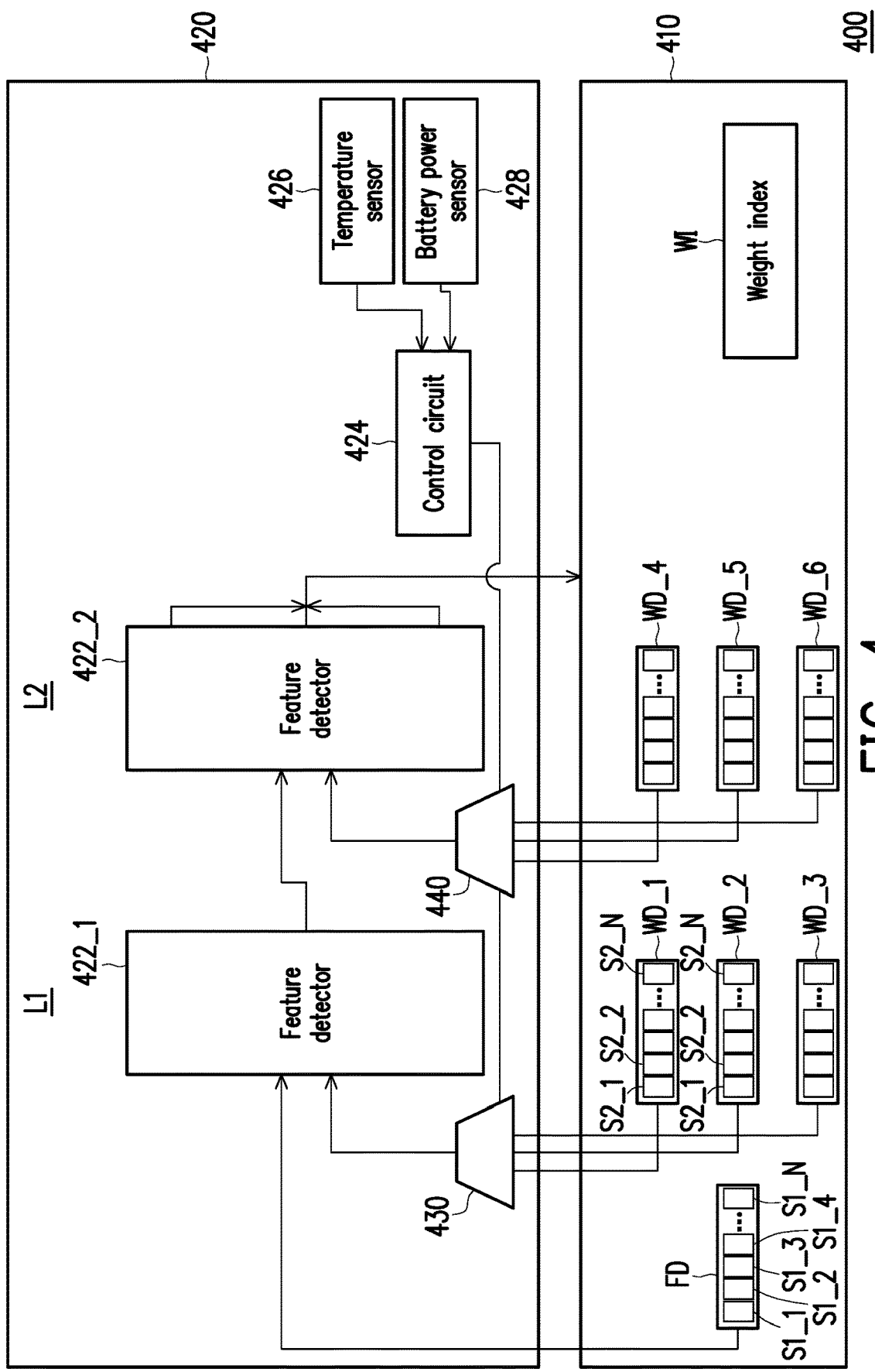
FIG. 4 is a block diagram of a memory chip according to an embodiment of the invention.

FIG. 4 is a block diagram of a memory chip according to an embodiment of the invention. With reference to FIG. 4, a memory chip 400 includes a memory array 410 and an artificial intelligence engine 420. The memory array 410 includes a plurality of memory areas for storing input feature data FD and 6 weight data WD_1 to WD_6. The artificial intelligence engine 420 includes a control circuit 424, a temperature sensor 426 and a battery power sensor 428.

Unlike the foregoing embodiment, the artificial intelligence engine 420 includes two feature detectors 422_1 and 422_2, a multiplexer 430 and a multiplexer 440. In this embodiment of the invention, the control circuit 424 can control the multiplexers 430 and 440 to sequentially transmit the weight data WD_1 to WD_6 to the feature detector 422_1 and the feature detector 422_2 for performing a neural network operation. In this way, as compared to the foregoing embodiment, with use of fewer feature detectors, the same number of the weight data may be processed and the same neural network operation may be performed.

Figure 5:
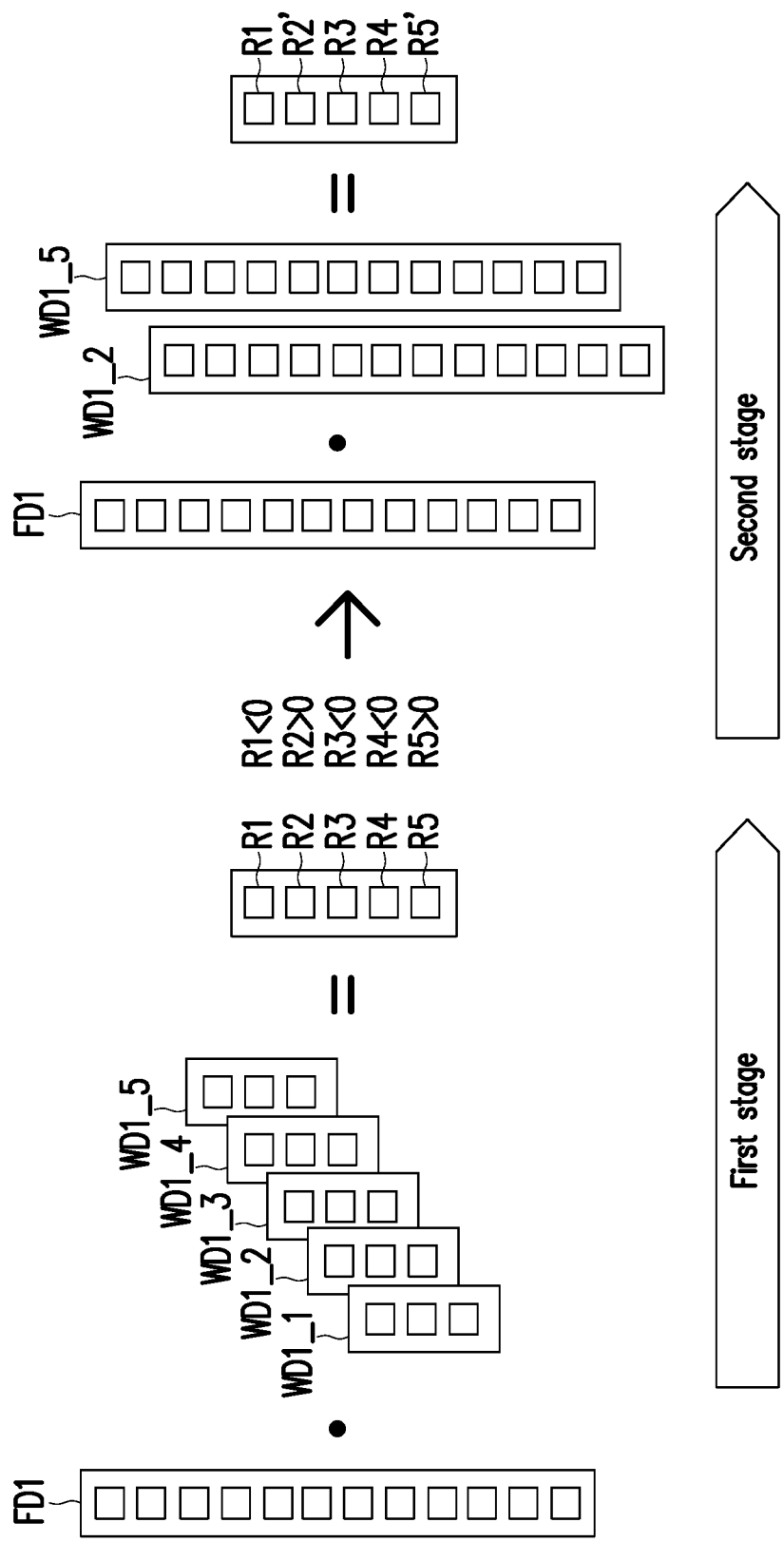
FIG. 5 is an example of the operation method of the memory chip capable of performing artificial intelligence operation according to an embodiment of the invention.

In an embodiment, an inner product operation having two stages may be adopted to perform the neural network operation to reduce the occurrence of errors. For instance, FIG. 5 is an example of the operation method of the memory chip capable of performing artificial intelligence operation according to an embodiment of the invention. In FIG. 5, the inner product operation has two stages. In a first stage, the inner product operation is performed on the input feature data FD1 and selected subsets in weight data WD1_1 to WD1_5. As shown by FIG. 5, each of the weight data WD1_1 to WD1_5 uses three of the second subsets consecutively arranged as the selected subset. After the inner product operation is performed on the selected subsets in the weight data WD1_1 to WD1_5 and the corresponding first subsets in the input feature data FD1 to generate inner product results R1 to R5, in a second stage, for any inner product result (R2, R5) among the inner product results R1 to R5 being a positive number, the inner product operation is re-performed on all of the first subsets of the input feature data FD1 and all of the second subsets in the corresponding weight data (WD1_2, WD1_5) so as to generate new inner product results R2' and R5'. Accordingly, by updating the inner product results R2 and R5 to the new inner product results R2' and R5', the occurrence of errors in the inner product operation may be reduced.

Figure 6:
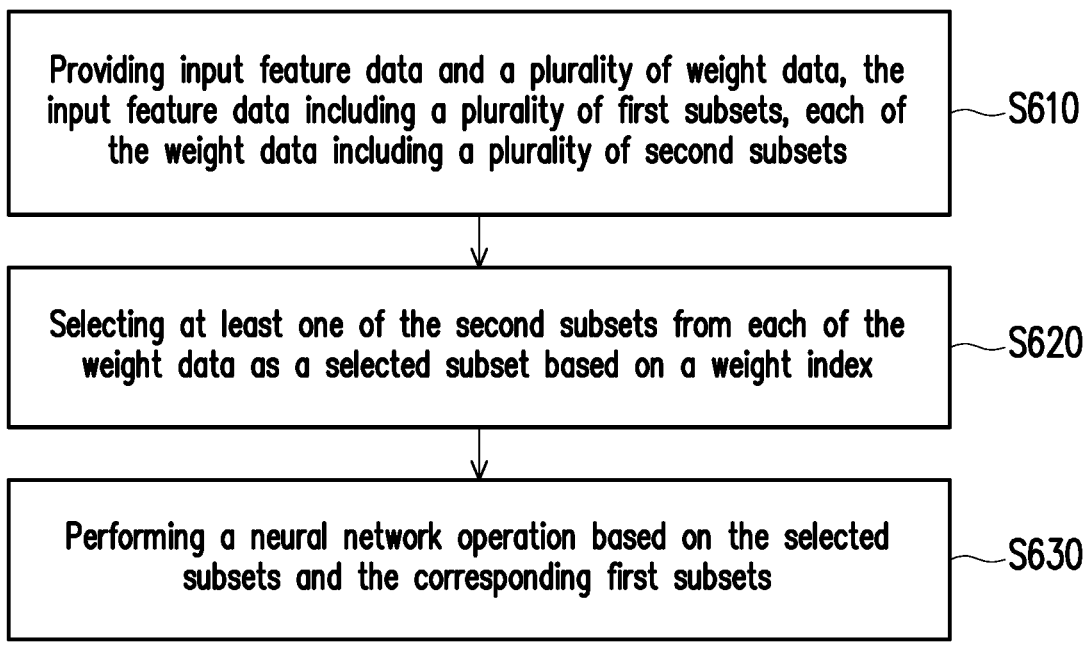
FIG. 6 is a flowchart of the operation method of the memory chip capable of performing artificial intelligence operation according to an embodiment of the invention.

FIG. 6 is a flowchart of the operation method of the memory chip capable of performing artificial intelligence operation according to an embodiment of the invention. With reference to FIG. 6, the operation method of the memory chip in this embodiment includes the following steps. Input feature data and a plurality of weight data are provided, the input feature data includes a plurality of first subsets, and each of the weight data includes a plurality of second subsets (step S610). Next, at least one of the second subsets is selected from each of the weight data as a selected subset based on a weight index (step S620). Lastly, a neural network operation is performed based on the selected subsets and the corresponding first subsets (step S630). Here, a sequence of steps S610, S620 and S630 is illustrative, and the embodiment of the invention is not limited thereto. Further, details regarding steps S610, S620 and S630 may refer to the embodiments of FIG. 1 to FIG. 5, which are not repeated hereinafter.

In summary, the invention can select the important subsets from the weight data for the neural network operation by a method approximate to the inner product operation. As a result, when the neural network operation with a very large number of parameters is performed on the electronic device, the parameters that need to be moved from the external memory outside a processing engine as well as the number of times for moving the parameters may both be reduced to achieve the purpose of reducing power consumption.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:
1. A memory chip capable of performing artificial intelligence operation, comprising:
 a memory array, configured to store input feature data and
  a plurality of weight data, the input feature data com- prising a plurality of first subsets, each of the weight data comprising a plurality of second subsets; and an artificial intelligence engine, coupled to the memory array, and comprising a plurality of feature detectors, the artificial intelligence engine being configured to access the memory array to obtain the input feature data and the weight data, wherein each of the feature detectors selects at least one of the second subsets from the corresponding weight data as a selected subset based on a weight index, and the feature detectors perform a neural network operation based on the selected subsets and the corresponding first subsets.

2. The memory chip according to claim 1, wherein in a low power mode, each of the feature detectors selects at least one of the second subsets from the corresponding weight data as the selected subset based on the weight index to perform the neural network operation.

3. The memory chip according to claim 2, wherein each of the feature detectors selects a plurality of the second subsets consecutively arranged as the selected subset based on the weight index.

4. The memory chip according to claim 1, wherein after the feature detectors perform an inner product operation on the selected subsets and the corresponding first subsets to generate a plurality of inner product results, for any inner product result among the inner product results being a positive number, the corresponding feature detector re-performs the inner product operation on all of the first subsets of the input feature data and all of the second subsets in the corresponding weight data so as to update the inner product results.

5. The memory chip according to claim 2, wherein the artificial intelligence engine comprises a temperature sensor, and the artificial intelligence engine enters the low power mode when the temperature sensor senses that a temperature is greater than a temperature threshold.

6. The memory chip according to claim 2, wherein the artificial intelligence engine comprises a battery power sensor, and the artificial intelligence engine enters the low power mode when the battery power sensor senses that a battery power is less than a power threshold.

7. The memory chip according to claim 2, wherein the artificial intelligence engine comprises a control circuit, and each of the feature detectors comprises:
a weight index determinator, obtaining the weight index from the memory array to output a weight index determination signal;
an NAND gate, having a first input terminal coupled to the weight index determination signal, and having a second input terminal coupled to the control circuit to receive a low power determination signal;
a switch, having a first terminal coupled to an operating voltage, and having a control terminal coupled to an output terminal of the NAND gate;
an AND gate, having a first input terminal coupled to the output terminal of the NAND gate, and having a second input terminal coupled to a clock signal;
a multiplier, coupled to a second terminal of the switch and an output terminal of the AND gate, and receiving the input feature data and the corresponding weight data for performing a multiplication operation; and an accumulator, coupled to the output terminal of the NAND gate, an output terminal of the multiplier and the output terminal of the AND gate, and accumulating operation results of the multiplier based on the weight index determination signal and the low power determination signal.

8. The memory chip according to claim 1, wherein the artificial intelligence engine is disposed on an independent chip outside the memory chip.

9. An operation method of a memory chip capable of performing artificial intelligence operation, comprising:
providing input feature data and a plurality of weight data, the input feature data comprising a plurality of first subsets, each of the weight data comprising a plurality of second subsets;
selecting at least one of the second subsets from each of the weight data as a selected subset based on a weight index; and
performing a neural network operation based on the selected subsets and the corresponding first subsets.

10. The operation method according to claim 9, wherein the step of selecting the at least one of the second subsets from each of the weight data as the selected subset based on the weight index comprises:
determining whether a low power mode is being entered; and
when determining that the low power mode is being entered, obtaining the weight index from a memory area, and selecting at least one of the second subsets from each of the weight data as the selected subset based on the weight index.

11. The operation method according to claim 10, wherein the step of selecting the at least one of the second subsets from each of the weight data as the selected subset based on the weight index comprises:
selecting a plurality of the second subsets consecutively arranged as the selected subset based on the weight index.

12. The operation method according to claim 9, wherein the step of performing the neural network operation based on the selected subsets and the corresponding first subsets comprises:
performing an inner product operation on the selected subsets and the corresponding first subsets to generate a plurality of inner product results; and
for any inner product result among the inner product results being a positive number, re-performing the inner product operation on all of the first subsets of the input feature data and all of the second subsets in the corresponding weight data so as to update the inner product results.

13. The operation method according to claim 10, further comprising:
entering the low power mode when sensing that a temperature is greater than a temperature threshold.

14. The operation method according to claim 10, further comprising:
entering the low power mode when sensing that a battery power is less than a power threshold.

* * * * *